United States Patent
Zhang et al.

(10) Patent No.: US 11,704,942 B2
(45) Date of Patent: Jul. 18, 2023

(54) UNDERCARRIAGE WEAR PREDICTION USING MACHINE LEARNING MODEL

(71) Applicant: Caterpillar Inc., Peoria, IL (US)

(72) Inventors: Li Zhang, Dunlap, IL (US); Eric J. Johannsen, Washington, IL (US); Yanchai Zhang, Dunlap, IL (US); Xuefei Hu, Dunlap, IL (US); Daniel W. Hoyt, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 323 days.

(21) Appl. No.: 16/949,448

(22) Filed: Oct. 29, 2020

(65) Prior Publication Data

US 2022/0139117 A1 May 5, 2022

(51) Int. Cl.
*G07C 5/00* (2006.01)
*G06N 20/00* (2019.01)
*G07C 5/08* (2006.01)

(52) U.S. Cl.
CPC ............ *G07C 5/006* (2013.01); *G06N 20/00* (2019.01); *G07C 5/0808* (2013.01); *G07C 5/0816* (2013.01)

(58) Field of Classification Search
CPC .... G07C 5/006; G07C 5/0808; G07C 5/0816; G07C 5/008; G06N 20/00; G06N 5/003; G06N 3/08; G05B 2219/2616; G05B 23/0283; G01M 17/00; G01M 13/00
See application file for complete search history.

(56) References Cited

U.S. PATENT DOCUMENTS

| | | | |
|---|---|---|---|
| 7,113,843 B2 * | 9/2006 | Bahlmann | B65H 54/26 700/130 |
| 7,826,946 B2 | 11/2010 | Schneider et al. | |
| 9,880,075 B2 | 1/2018 | Finch et al. | |
| 9,881,428 B2 | 1/2018 | Barfield, Jr. et al. | |
| 10,282,834 B1 * | 5/2019 | Finch | G06T 7/50 |
| 2016/0350671 A1 | 12/2016 | Morris, II et al. | |
| 2018/0059656 A1 | 3/2018 | Hiruta et al. | |
| 2019/0033171 A1 | 1/2019 | Zhang et al. | |
| 2019/0139211 A1 | 5/2019 | Morawitz et al. | |
| 2019/0337386 A1 * | 11/2019 | Anderson | E02F 9/202 |
| 2020/0114992 A1 | 4/2020 | Edelin et al. | |

FOREIGN PATENT DOCUMENTS

| | | | |
|---|---|---|---|
| CN | 110954314 | 4/2020 | |
| DE | 10257793 A1 | 7/2004 | |
| EP | 3627408 | 3/2020 | |
| WO | WO-2020206142 A1 * | 10/2020 | G01M 17/007 |

* cited by examiner

*Primary Examiner* — Joseph J Dallo (57) ABSTRACT

A system may comprise a device. The device may be configured to receive, from one or more sensor devices of the machine, sensor data associated with wear of one or more components of an undercarriage of the machine; and predict, using a machine learning model and the sensor data, an amount wear of the one or more components based on a wear rate of the one or more components. The machine learning model is trained, using training data, to predict the wear rate of the one or more components. The training data includes two or more of: historical sensor data, historical inspection data, or simulation data, of a simulation model, from one or more third devices. The device may perform an action based on the amount of wear.

20 Claims, 3 Drawing Sheets

UNDERCARRIAGE WEAR PREDICTION USING MACHINE LEARNING MODEL

TECHNICAL FIELD

The present disclosure relates generally to monitoring wear of an undercarriage of a machine and, for example, to predicting wear of the undercarriage using a machine learning model.

BACKGROUND

Components (e.g., track links, bushings, and/or pins) of an undercarriage of a machine wear over a period of time. One technique for detecting wear of the components includes obtaining manual measurements of component dimensions of such components. The manual measurements may be compared against specified dimensions of the components. In order to obtain the manual measurements, the machine is required to suspend performing a task at a work site. Because obtaining manual measurements requires the machine to suspend performing the task and is a time consuming process (e.g., due to the travel time for obtaining manual measurements and/or the amount of time for obtaining manual measurements), obtaining manual measurements may negatively affect productivity at the work site. In this regard, the task (that is to be performed by the machine) may be suspended for a long period of time (e.g., a period of time during which the manual measurements are obtained).

Additionally, such manual measurements can be inaccurate. Inaccurate measurements of component dimensions, in turn, may result in incorrect predictions regarding a remaining life of the components. As a result of such incorrect predictions, the components may either fail prematurely or may be repaired or replaced prematurely (e.g., because the components may not be sufficiently worn to require replacement or repair). Such premature failure of the components or premature replacement or repair of the components also negatively affects productivity at the work site. Accordingly, the above technique for detecting wear of the components need to be improved to prevent or reduce down time at the work site (e.g., down time associated with obtaining manual measurements of component dimensions, associated with premature failure of components, associated with premature repair of components, associated with premature replacement of components, and/or the like).

German Patent Application Publication No. DE10257793 (the "'793 publication") discloses a model-based lifetime observer for the calculation of the remaining life of a selected component. The '793 publication discloses that model-based lifetime observer links the measurement of operational loads, by means of available sensor devices, with a model-based preparation of the measured loads.

While the '793 publication discloses a model-based lifetime observer, the '793 publication does not disclose that data (from the available sensor devices) accounts for external factors that may affect the wear of the selected component. Accordingly, model-based lifetime observer of the '793 publication may incorrectly predict the remaining life of the components.

The wear detection device of the present disclosure solves one or more of the problems set forth above and/or other problems in the art.

SUMMARY

A method performed by a first device includes receiving, from one or more second devices, historical sensor data associated with wear of one or more components of an undercarriage of a machine; receiving, from one or more third devices, historical inspection data associated with the wear of the one or more components; training, using the historical sensor data and the historical inspection data, a machine learning model to predict a remaining life of the one or more components; receiving, from one or more sensor devices of the machine, sensor data associated with the wear of the one or more components; predicting, using the machine learning model and based on the sensor data, the remaining life of the one or more components; and causing an action to be performed based on the remaining life of the one or more components.

A machine includes one or more memories; and one or more processors configured to: receive, from one or more sensor devices of the machine, sensor data associated with wear of one or more components of an undercarriage of the machine; predict, using a machine learning model and the sensor data, an amount wear of the one or more components based on a wear rate of the one or more components, wherein the machine learning model is trained, using training data, to predict the wear rate of the one or more components, wherein the training data includes two or more of: historical sensor data, historical inspection data, or simulation data, of a simulation model, from one or more third devices, and wherein the two or more of the historical sensor data, the historical inspection data, or the simulation data are associated with wear of the one or more components; and perform an action based on the amount of wear of the one or more components.

A system includes a device configured to: receive, from one or more sensor devices of a machine, sensor data associated with wear of one or more components of an undercarriage of the machine; predict, using a machine learning model and based on the sensor data, a remaining life of the one or more components, wherein the machine learning model is trained, to predict the remaining life of the one or more components, using training data that includes two or more of: historical sensor data, historical inspection data, or simulation data of a simulation model, wherein the two or more of the sensor data, the historical inspection data, or the simulation data are associated with wear of one or more components; and cause an action to be performed based on the remaining life of the one or more components.

DETAILED DESCRIPTION

This disclosure relates to a device that predicts, using a machine learning model, remaining life of one or more components of an undercarriage of a machine. The term "machine" may refer to any machine that performs an operation associated with an industry such as, for example, mining, construction, farming, transportation, or another industry. Moreover, one or more implements may be connected to the machine.

Figure 1:
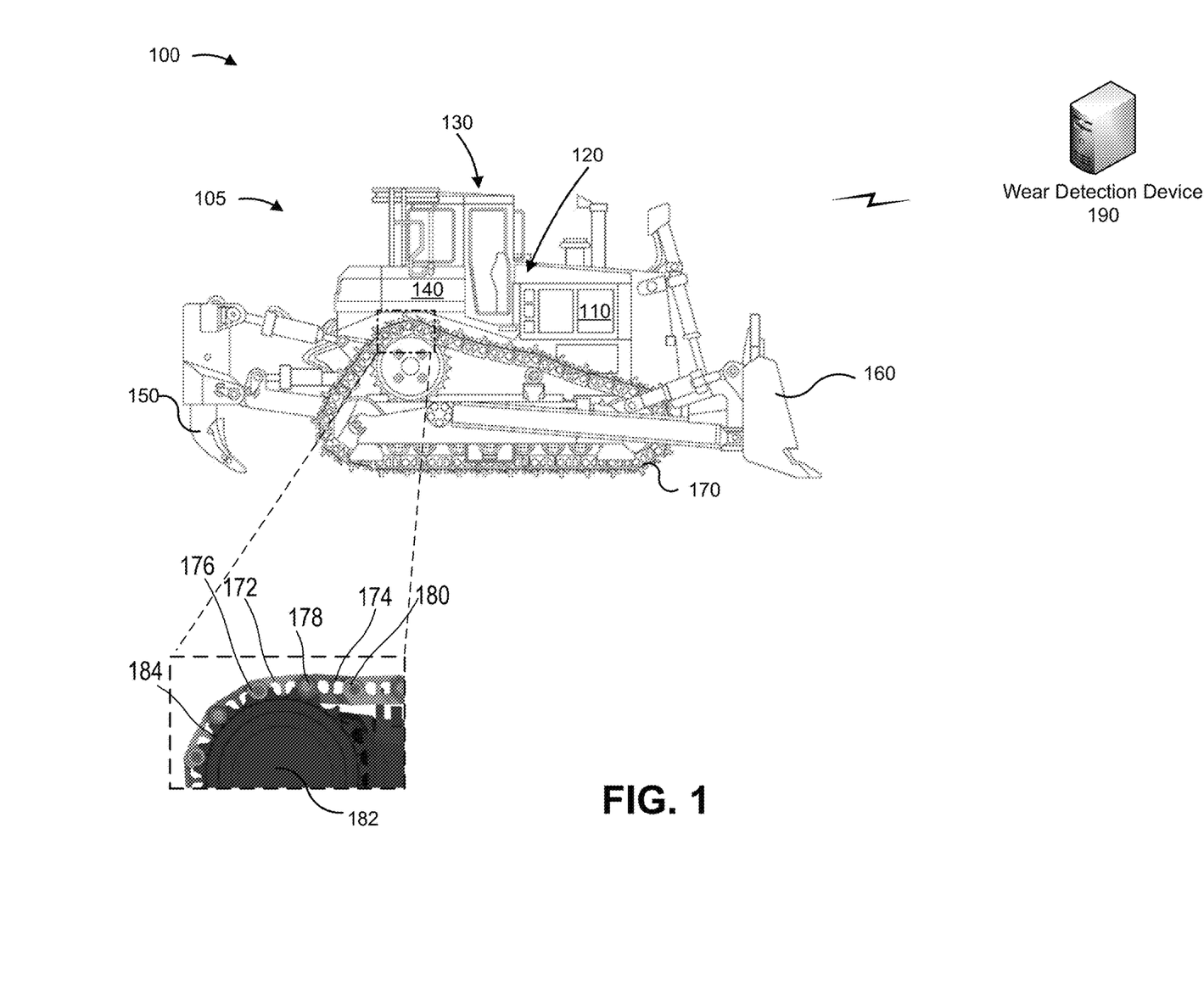
FIG. 1 is a diagram of an example implementation described herein.

FIG. 1 is a diagram of an example implementation 100 described herein. As shown in FIG. 1, the example implementations 100 includes a machine 105 and a wear detection device 190. Machine 105 is embodied as an earth moving machine, such as a dozer. Alternatively, the machine 105 may be another type of track-type machine such as an excavator.

As shown in FIG. 1, machine 105 includes an engine 110, a sensor system 120, an operator cabin 130, a controller 140, a rear attachment 150, a front attachment 160, and ground engaging members 170.

Engine 110 may include an internal combustion engine, such as a compression ignition engine, a spark ignition engine, a laser ignition engine, a plasma ignition engine, and/or the like. Engine 110 provides power to machine 105 and/or a set of loads (e.g., components that absorb power and/or use power to operate) associated with machine 105. For example, engine 110 may provide power to one or more control systems (e.g., controller 140), sensor system 120, operator cabin 130, and/or ground engaging members 170.

Engine 110 can provide power to an implement of machine 105, such as an implement used in mining, construction, farming, transportation, or any other industry. For example, engine 110 may power components (e.g., one or more hydraulic pumps, one or more actuators, and/or one or more electric motors) to facilitate control of rear attachment 150 and/or front attachment 160 of machine 105.

Sensor system 120 may include sensor devices that are capable of generating signals regarding an amount of wear of one or more components of an undercarriage of machine 105 (as described in more details below). The types of sensor devices, of sensor system 120, are described in more detail below in connection with FIG. 2.

Operator cabin 130 includes an integrated display (not shown) and operator controls (not shown). Operator controls may include one or more input components (e.g., integrated joysticks, push-buttons, control levers, and/or steering wheels) to control an operation of machine 105. For an autonomous machine, operator controls may not be designed for use by an operator and, rather, may be designed to operate independently from an operator. In this case, for example, operator controls may include one or more input components that provide an input signal for use by another component without any operator input.

Controller 140 (e.g., an electronic control module (ECM)) may control and/or monitor operations of machine 105. For example, controller 140 may control and/or monitor the operations of machine 105 based on signals from the operator controls, from sensor system 120, and/or wear detection device 190. In some instances, controller 140 may predict an amount of wear of the one or more components of the undercarriage based on the signals from sensor system 120 and wear detection device 190, as described in more detail below.

Front attachment 150 may include a blade assembly. Rear attachment 150 may include a ripper assembly, a winch assembly, and/or a drawbar assembly.

Ground engaging members 170 may be configured to propel machine 105. Ground engaging members 170 may include wheels, tracks, rollers, or the like, for propelling machine 105. In some instances, ground engaging members 170 may include an undercarriage that includes tracks (as shown in FIG. 1). The tracks may include track links. A track link may include a track link bushing and a track link pin. As an example, the tracks may include a first track link 172 and a second track link 174. First track link 172 includes a first track link bushing 176 and a first track link pin 178. Second track link 174 includes a second track link pin 180.

Sprocket 182 may include one or more segments 184 (referred to herein individually as "segment 184," and collectively as "segments 184"). Sprocket 182 may be configured to engage with ground engaging members 170 and to drive ground engaging members 170. For example, segments 184 may be configured to engage track link bushings (e.g., of the tracks of ground engaging members 170) and rotate to cause the tracks to propel machine 105.

Wear detection device 190 may include one or more devices capable of predicting an amount of wear of the one or more components of the undercarriage (e.g., one or more tracks, track links, one or more track link bushings, one or more track link pins, one or more sprockets 182, and/or one or more segments 184). Based on the amount of wear, wear detection device 190 may predict a remaining life of the one or more components. In some example, wear detection device 190 may predict a wear rate of the one or more components and predict the amount of wear based on the wear rate. Wear detection device 190 may use a machine learning model to predict the amount of wear of the one or more components, as described in more detail below. Wear detection device 190 may be located within machine 105, external to machine 105, or partially within and partially external to machine 105.

As indicated above, FIG. 1 is provided as an example. Other examples may differ from what was described in connection with FIG. 1.

Figure 2:
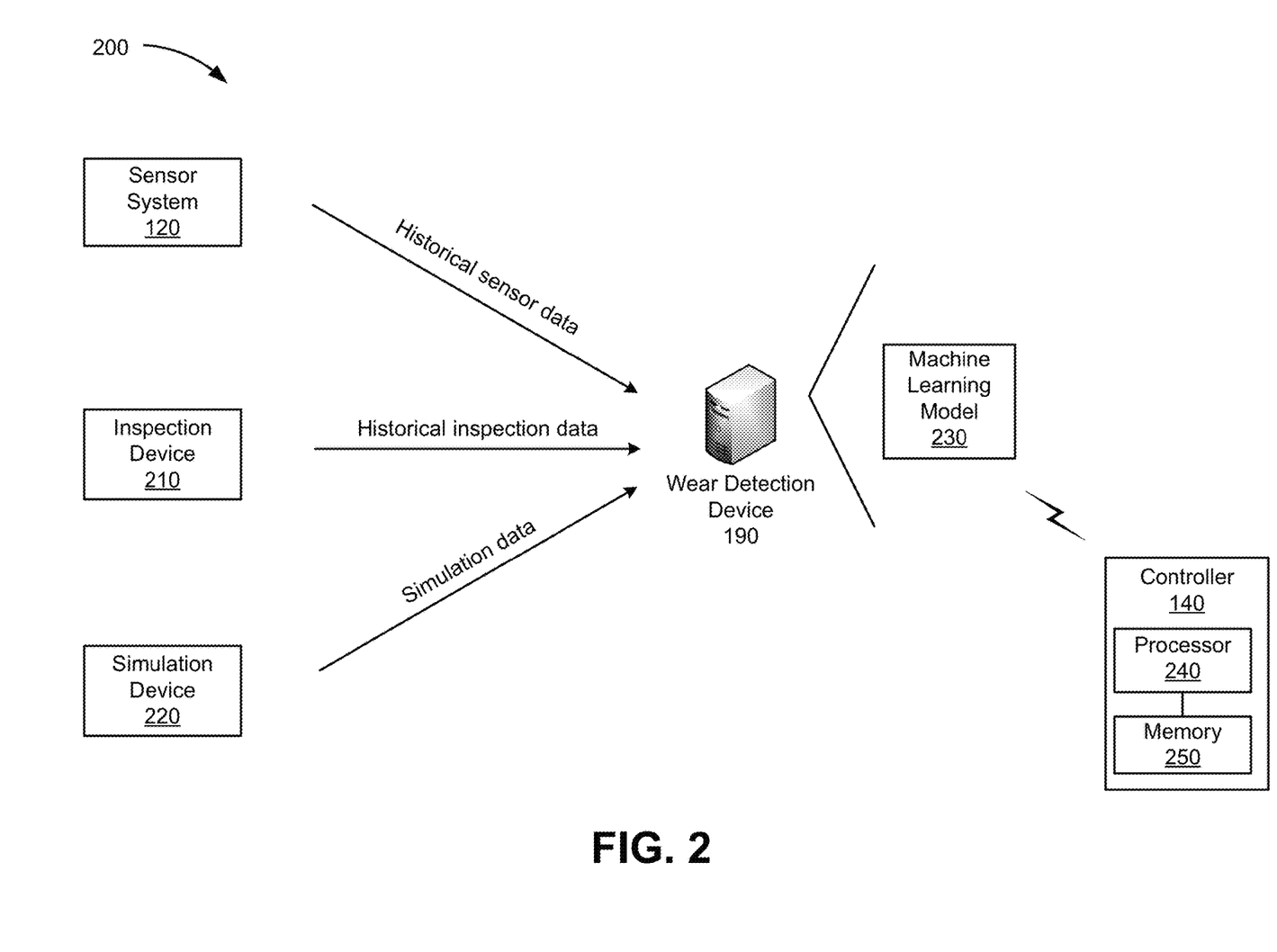
FIG. 2 is a diagram of an example described herein.

FIG. 2 is a diagram of an example system 200 described herein. As shown in FIG. 2, system 200 includes sensor system 120, controller 140, wear detection device 190, an inspection device 210, a simulation device 220, and a machine learning model 230. In some examples, wear detection device 190, inspection device 210, and/or simulation device 220 may be part of a site management system (e.g., of a work site associated with machine 105).

Alternatively, wear detection device 190, inspection device 210, and/or simulation device 220 may be part of a back office system. Wear detection device 190, inspection device 210, and/or simulation device 220 may be included in a same device. Alternatively, wear detection device 190, inspection device 210, and/or simulation device 220 may be separate devices.

Sensor system 120 may include sensor devices that generate sensor data associated with an amount of wear of the one or more components of the undercarriage (e.g., one or more tracks, track links, one or more track link bushings, one or more track link pins, one or more sprockets 182, and/or one or more segments). The sensor data may be used to infer an amount of wear of the one or more components. The sensor data may include information identifying times at which and/or dates on which the sensor data was generated.

The sensor data may include historical sensor data that is used to train machine learning model 230 to predict an amount of wear of the one or more components of the undercarriage. For example, sensor system 120 may provide the historical sensor data to wear detection device 190 to train machine learning model 230, as explained in more detail below in connection with training machine learning model 230.

For instance, sensor system 120 may provide the historical sensor data to wear detection device 190 periodically (e.g., every hour, every other hour, and/or every work shift). Additionally, or alternatively, sensor system 120 may provide the historical sensor data to wear detection device 190 (e.g., to train machine learning model 230) based on a triggering event (e.g., a request from wear detection device 190, a request from controller 140, and/or a request from an operator of machine 105 (e.g., via the integrated display and/or operator controls).

After machine learning model 230 has been trained, sensor system 120 may provide the sensor data as an input to machine learning model 230 to predict the amount of wear of the one or more components. Sensor system 120 may provide the sensor data as input to machine learning model 230 on a periodic basis and/or based on a triggering event.

The sensor devices may include a vibration sensor device, a sound sensor device, a track link wear sensor device, a location sensor device, a speed sensor device, a motion sensor device, a load sensor device, a pressure sensor device, a flow sensor device, and/or a temperature sensor device.

The vibration sensor device may include one or more devices that sense a vibration of machine 105 and generate machine vibration data based on the vibration. As an example, the vibration sensor device may include one or more inertial measurement units (IMUs). The machine vibration data may indicate a measure of vibration of machine 105.

The sound sensor device may include one or more devices that sense sound (or noise) emanating from machine 105 and generate machine sound data based on the sound. The sound data may identify a measure of sound associated with machine 105. The track link wear sensor device may include one or more devices that sense wear of track links of machine 105 and generate track link wear data. The track link wear data may identify a measure of wear of the track links.

The location sensor device may include one or more devices that sense a location of machine 105 and generate location data identifying the location. As an example, the location senor device may include a global positioning system (GPS) receiver and/or a GPS sensor. The location data may identify the location of the machine. The location may include a work site where machine 105 performs a task.

The motion sensor device may include one or more devices that sense the speed associated with machine 105 and generate speed data identifying the speed associated with machine 105. The motion sensor device may include an accelerometer, a tachometer, a speedometer, and/or an IMU. In some implementations, the motion sensor device may further sense a distance traveled by machine 105 and may generate distance data identifying the distance traveled by machine 105. The distance may correspond to a distance traveled by machine 105 while performing a task. Additionally, or alternatively, the distance may correspond to a distance traveled since a repair and/or a replacement of the one or more components. The motion sensor device may monitor an amount of time during which machine 105 is used (e.g., to perform a task) and generate machine time data identifying the amount of time during which machine 105 is used.

The load sensor device may include one or more devices that are capable of sensing a load of engine 110 and generate load data identifying a load of engine 110. The pressure sensor device may include one or more sensor devices that are capable of sensing a pressure of fluid of a hydraulic system that facilitates control of rear attachment 150 and/or front attachment 160 of machine 105 and generating pressure data identifying the pressure of the fluid of the hydraulic system. The pressure sensor device may include a pressure sensor and/or a pressure transducer.

A flow sensor device may include one or more sensor devices that are capable of sensing a flow rate of fluid of the hydraulic system and generating flow data identifying the flow rate of the fluid of the hydraulic system. The flow sensor device may include a flow sensor, a flow rate monitor, and/or a pump flow rate.

A temperature sensor may include one or more sensor devices that are capable of sensing a temperature of different components of machine 105 (e.g., a temperature of the hydraulic system and/or a temperature of engine 110) and generating temperature data identifying the temperature of the different components of machine 105.

Controller 140 may include one or more processors 240 (referred to herein individually as "processor 240," and collectively as "processors 240"), and one or more memories 250 (referred to herein individually as "memory 250," and collectively as "memories 250"). A processor 240 is implemented in hardware, firmware, and/or a combination of hardware and software. Processor 240 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. A processor 240 may be capable of being programmed to perform a function.

Memory 250 includes a random-access memory (RAM), a read only memory (ROM), and/or another type of dynamic or static storage device (e.g., a flash memory, a magnetic memory, and/or an optical memory) that stores information and/or instructions for use by a processor 240 to perform a function. For example, when performing the function, controller 140 may obtain sensor data (e.g., from sensor system 120) and may cause wear detection device 190 to predict (e.g., using machine learning model 230) an amount of wear of the one or more components based on the sensor data.

Wear detection device 190 may include one or more devices (e.g., a server device or a group of server devices) configured to train machine learning model 230 to predict the amount of wear of the one or more components of the undercarriage, as explained in more detail below. In some implementations, wear detection device 190 may be implemented by one or more computing resources of a cloud computing environment. For example, wear detection device 190 may be hosted in the cloud computing environment. Alternatively, wear detection device 190 may be non-cloud-based or may be partially cloud-based.

Inspection device 210 may include one or more devices that are capable of providing historical inspection data regarding historical inspections of machine 105. The historical inspection data may include information identifying times and/or dates associated with when the historical inspections were performed (e.g., times and/or dates of the historical inspections). The historical inspections may be performed (e.g., manually) at one or more locations (e.g., one or more work sites) of machine 105. In some examples, when providing the inspection data, inspection device 210 may provide data from historical inspection reports regarding the historical inspections of machine 105. As an example, a historical inspection report may include information identifying one or more inspections performed and information identifying a time and/or a date associated with the inspection report (e.g., a time and/or a date of an inspection of machine 105). The information identifying the one or more inspections may include a measure of wear of the one or more components, an overall assessment of a condition of the one or more components, a measure of abrasiveness of a task performed by machine 105, a track tension of machine 105, environmental conditions at a location associated with machine 105, and/or another type of inspection related to an amount of wear of the one or more components.

The historical inspection data may be used to train machine learning model 230 to predict the amount of wear of the one or more components of the undercarriage. For example, inspection device 210 may provide the historical inspection data to wear detection device 190 to train machine learning model 230, as explained in more detail below in connection with training machine learning model 230.

The historical inspection data may include information obtained based on measurements (e.g., manual measurements associated with the historical inspections) associated with machine 105. For example, the historical inspection data may include abrasiveness data identifying a measure of abrasiveness of a task performed by machine 105 at a location, environmental data identifying environmental conditions at the location during performance of the task, track tension data identifying a track tension of machine 105 (e.g., as a result of performing the task at the location). The measure of abrasiveness may indicate an amount of wear of the one or more components as a result of performing the task location. The environmental data may include moisture data identifying a measure of moisture (e.g., moisture of soil) at the location and/or dryness data identifying a measure of dryness (e.g., dryness of soil) at the location.

Additionally, the historical inspection data may include operator behavior data. For example, the operator behavior data may include information identifying a speed of machine 105 when performing the task, information identifying a load of engine 110 when machine 105 is performing the task, information identifying a distance traveled by machine 105 while performing a task, an amount of time machine 105 is used to perform the task, information identifying a pressure of fluid of the hydraulic system when machine 105 is performing the task, and/or a flow rate of the fluid of the hydraulic system when machine 105 is performing the task. Some or all of the operator behavior data may be determined based on the sensor data. In some instances, the operator behavior data may include information identifying a type of task performed by machine 105.

Simulation device 220 may include one or more devices that may include a simulation model that simulates an operation of machine 105 (e.g., to achieve a particular measure of wear of the one or more components). Simulation device 220 may generate simulation data by simulating an operation of machine 105 and the wear of the one or more components.

The simulation data may be used to train machine learning model 230 to predict the amount of wear of the one or more components of the undercarriage. For example, simulation device 220 may provide the simulation data to wear detection device 190 to train machine learning model 230, as explained in more detail below in connection with training machine learning model 230. In some implementations, simulation data may indicate a correlation between the measure of vibration of machine 105 and an amount of wear of the one or more components.

As shown in FIG. 2, wear detection device 190 may receive the historical sensor data from sensor system 120, the historical inspection data from inspection device 210, and the simulation data from simulation device 220. The historical sensor data, the historical inspection data, and/or the simulation data may be included in training data that is used to train machine learning model 230 to predict an amount of wear of the one or more components. Based on the amount of wear, machine learning model 230 may predict a remaining life of the one or more components. In some examples, machine learning model 230 may be trained to predict a wear rate of the one or more components and predict the amount of wear of the one or more components based on the wear rate.

In some implementations, machine learning model 230 may be trained to predict an amount of wear of the one or more components of machine 105. Additionally, machine learning model 230 may be trained to predict an amount of wear of one or more components of an undercarriage of a group of machines that are similar to machine 105 (e.g., similar or same type of machines, similar or same specification, similar or same components, and/or similar or same type of tasks performed). In this regard, the training data may include historical sensor data, historical inspection data, and/or simulation data associated with the group of machines.

Based on training machine learning model 230, wear detection device 190 (e.g., using machine learning model 230) may identify factors impacting a wear rate of the one or more components (and/or an amount wear of the one or more components). The factors may include the measure of abrasion, the location, the measure of moisture, the operator behavior (which may identify a task performed by machine 105), the distance traveled, the speed associated with the distance traveled, the track tension, the drawbar force, the measure of vibration of machine 105, and/or the measure of sound of machine 105.

In some examples, based on training machine learning model 230, wear detection device 190 (e.g., using machine learning model 230) may determine a correlation between a measure of abrasion and a location of machine 105 (e.g., based on the historical inspection data). For example, wear detection device 190 (e.g., machine learning model 230) may determine that the measure of abrasion is based on the location of machine 105. For instance, wear detection device 190 may determine that a first measure of abrasion at a first location (e.g., a first work site) exceeds a second measure of abrasion at a second location (e.g., a second work site). Accordingly, wear detection device 190 (e.g., using machine learning model 230) may determine that the wear rate of the one or more components (and, accordingly, the amount of wear) at the first location exceeds the wear rate of the one or more components (and, accordingly, the amount of wear).

Additionally, wear detection device 190 (e.g., using machine learning model 230) may determine a correlation between environmental conditions at a location and the wear rate of the one or more components (e.g., based on the historical inspection data). For example, wear detection device 190 may determine that the measure of moisture at the first location exceeds the measure of moisture at the second location. Accordingly, wear detection device 190 (e.g., using machine learning model 230) may determine that the wear rate of the one or more components increases as the measure of moisture increases. In some examples, wear detection device 190 may confirm that the wear rate of the one or more components increases as the measure of moisture increases if wear detection device 190 determines that machine 105 performed a same task at the first location and at the second location.

Wear detection device 190 (e.g., using machine learning model 230) may determine a correlation between a task performed and the wear rate of the one or more components (e.g., based on the historical inspection data and/or the historical sensor data). For example, wear detection device 190 (e.g., using machine learning model 230) may identify a first type of task (e.g. a task associated with moving material) based on analyzing first operator behavior data and identify a second type of task (e.g., a task not associated with moving material such as driving to a work site) based on analyzing second operator behavior data. Wear detection device 190 may determine that a wear rate associated with the first type of task exceeds a wear rate associated with the second type of task.

In some implementations, wear detection device 190 (e.g., using machine learning model 230) may determine a correlation between the task performed and a track tension in order to determine the correlation between a task performed and the wear rate of the one or more components. For example, wear detection device 190 may analyze the historical track tension data to determine that a first track tension of machine 105 (resulting from performing the first type of task) is less than a second track tension of machine 105 (resulting from performing the second type of task).

Wear detection device 190 (e.g., using machine learning model 230) may determine a correlation between a drawbar force used to perform a task and the wear rate of the one or more components (e.g., based on the historical inspection data and/or the historical sensor data). In some examples, wear detection device 190 may determine drawbar force data identifying an amount of the drawbar force used by machine while performing a task. Wear detection device 190 may determine the drawbar force data based on historical load data, historical speed data, historical distance data and/or historical temperature data. Wear detection device 190 (e.g., using machine learning model 230) may determine that the wear rate of the one or more components increases as the drawbar force increases. For example, wear detection device 190 may determine that the wear rate of the one or more components increases as the load of engine 110.

Wear detection device 190 (e.g., using machine learning model 230) may determine a correlation between a measure of wear of the one or more components and a measure of vibration of machine 105 (e.g., using the simulation data, the historical sensor data, and/or the historical inspection data). For example, wear detection device 190 may determine that the simulation data indicates a correlation between an amount of wear of the one or more components and a measure of vibration of machine 105.

Wear detection device 190 may analyze the historical sensor data (e.g. historical machine vibration data) and the historical inspection data (e.g., historical abrasiveness data and/or historical track tension) to correlate a measure of vibration with a measure of abrasiveness or a measure of track tension. For example, wear detection device 190 (e.g., using machine learning model 230) may determine that a first measure of vibration (e.g., based on first historical vibration data) corresponding to a first measure of abrasiveness (e.g., first abrasiveness data) exceeds a second measure of vibration (e.g., based on second historical vibration data) corresponding to a second measure of abrasiveness (e.g., second abrasiveness data). Wear detection device 190 may determine that the first measure of abrasiveness exceeds the second measure of abrasiveness and that the first measure of vibration exceeds the second measure of vibration. Based on analyzing the historical sensor data and the historical inspection data, wear detection device 190 may confirm the correlation between the amount of wear of the one or more components and the measure of vibration of machine 105. For example, wear detection device 190 (e.g., using machine learning model 230) may determine that the measure of vibration increases as the wear of the one or more components increases.

Similarly, wear detection device 190 may analyze the historical machine vibration data and the historical track link wear data to determine that the measure of vibration increases as the wear of the one or more components increases. Similarly, wear detection device 190 (e.g., using machine learning model 230) may determine a correlation between a measure of wear of the one or more components and a measure of sound of machine 105 (e.g., using the simulation data, the historical sensor data, and/or the historical inspection data). For example, wear detection device 190 (e.g., using machine learning model 230) may determine that the measure of sound increases as the wear of the one or more components increases.

Based on the foregoing, machine learning model 230 may be trained to predict the wear rate and/or the amount of wear of the one or more components based on the location, the measure of moisture, the operator behavior (e.g. associated with performing a task), the distance traveled (e.g., while machine 105 is performing the task), the speed associated the distance traveled, the track tension, the drawbar force (e.g., while machine 105 is performing the task), the measure of vibration, and/or the measure of sound. Based on the predicted wear rate and/or wear of the one or more components, machine learning model 230 may predict a date and/or a time when the one or more components are to be replaced and/or repaired. The predicted wear rate of the one or more components, the predicted amount of wear of the one or more components, and/or the predicted date and/or time may be referred to hereinafter as "predicted component wear information."

When training machine learning model 230, wear detection device 190 may portion the training data into a training set (e.g., a set of data to train machine learning model 230), a validation set (e.g., a set of data used to evaluate a fit of machine learning model 230 and/or to fine tune machine learning model 230), a test set (e.g., a set of data used to evaluate a final fit of machine learning model 230), and/or the like. Wear detection device 190 may preprocess and/or perform dimensionality reduction to reduce the training data to a minimum feature set. Wear detection device 190 may train machine learning model 230 on this minimum feature set, thereby reducing processing to train machine learning model 230, and may apply a classification technique, to the minimum feature set.

Wear detection device 190 may use a classification technique, such as a logistic regression classification technique, a random forest classification technique, a gradient boosting machine learning (GBM) technique, and/or the like, to determine a categorical outcome (e.g., an amount of wear of the one or more components). In addition to, or as an alternative to use the classification technique, wear detection device 190 may use a naïve Bayesian classifier technique. In this case, wear detection device 190 may perform binary recursive partitioning to split the training data of the minimum feature set into partitions and/or branches and use the partitions and/or branches to perform predictions (e.g., a wear rate and/or an amount of wear of the one or more components). Based on using recursive partitioning, wear detection device 190 may reduce utilization of computing resources relative to manual, linear sorting and analysis of data items, thereby enabling use of thousands, millions, or billions of data items to train a model, which may result in a more accurate model than using fewer data items.

Wear detection device 190 may train machine learning model 230 using a supervised training procedure that includes receiving input to machine learning model 230 from a subject matter expert (e.g., one or more operators associated with machine 105 and/or the one or more machines), which may reduce an amount of time, an amount of processing resources, and/or the like to train machine learning model 230 relative to an unsupervised training procedure. Wear detection device 190 may use one or more other model training techniques, such as a neural network technique, a latent semantic indexing technique, and/or the like.

For example, wear detection device 190 may perform an artificial neural network processing technique (e.g., using a two-layer feedforward neural network architecture, a three-layer feedforward neural network architecture, and/or the like) to perform pattern recognition with regard to patterns of different amounts of wear of the one or more components. In this case, using the artificial neural network processing technique may improve an accuracy of machine learning model 230 generated by wear detection device 190 by being more robust to noisy, imprecise, or incomplete data, and by enabling wear detection device 190 to detect patterns and/or trends undetectable to human analysts or systems using less complex techniques.

After training, machine learning model 230 may be used to determine (or predict) predicted component wear information. In other words, wear detection device 190 may receive sensor data from machine 105 after training machine learning model 230 and input, into machine learning model 230, the received sensor data and machine learning model 230 may output data relating to the wear rate and/or an amount of wear of the one or more components. The received sensor data may include location data, operator behavior data, distance data (e.g., associated with a task), speed data (e.g., associated with the task), drawbar force data (e.g., associated with the task), vibration data, and/or sound data. The output of machine learning model 230 may include a score for the predicted component wear information. The score, for the predicted component wear information, may represent a measure of confidence of the predicted component wear information.

A different device, such as a server device, may generate and train machine learning model 230. The different device may provide machine learning model 230 for use by wear detection device 190. The different device may update and provide (e.g., on a scheduled basis, on an on-demand basis, on a triggered basis, on a periodic basis, and/or the like) machine learning model 230 to wear detection device 190. In some instances, wear detection device 190 may receive additional training data (e.g., additional historical sensor data, additional historical inspection data, and/or additional simulation data) and retrain machine learning model 230. Alternatively, wear detection device 190 may provide the additional training data to the different device to train machine learning model 230. Machine learning model 230 may be retrained on a periodic basis and/or based on a triggering event.

In some implementations, wear detection device 190 may provide machine learning model 230 to controller 140 to enable controller 140 to determine the predicted component wear information. Alternatively, wear detection device 190 may receive a request, from controller 140, to determine the predicted component wear information. The request may include sensor data of machine 105.

Wear detection device 190 (and/or controller 140) may perform an action based on the predicted component wear information. For example, the action may include wear detection device 190 causing an adjustment of an operation of machine 105 based on the predicted amount of wear of the one or more components (e.g., when the predicted amount of wear satisfies a threshold amount of wear). For instance, wear detection device 190 may cause a reduction of a speed of machine 105, a reduction of a load of engine 110, a reduction of a pressure of the hydraulic system, a reduction of a flow rate of the hydraulic system, a reduction of a temperature of the hydraulic system, and/or another operation that may reduce a wear rate of the one or more components and prolong the time until the one or more components have to be repaired or replaced.

Wear detection device 190 may cause machine 105 to navigate to a different work site and to perform one or more tasks at the different work site, in an effort to extend the life of the one or more components. For example, the different work site may be associated with a wear rate (of the one or more components) that is less than a wear rate (of the one or more components) associated with a work site where machine 105 is currently located. Additionally, or alternatively, wear detection device 190 may cause machine 105 to perform a different task in an effort to extend the life of the one or more components. For example, the different task may be associated with a wear rate (of the one or more components) that is less than a wear rate (of the one or more components) associated with a task that machine 105 is currently performing.

The action may include wear detection device 190 transmitting remaining life information to one or more devices that monitor an amount of wear of components of a plurality of machines (e.g., including machine 105). In some examples, wear detection device 190 may transmit the remaining life information when the amount of wear (of the one or more components) satisfies a threshold amount of wear. The remaining life information may indicate the amount of wear of the one or more components, indicate a wear rate of the one or more components, indicate the remaining life of the one or more components, and/or an offer associated with repairing and/or replacing the one or more components. The one or more devices may include a device of the site management system, a device of the back office system, a device associated with the operator of machine 105, a device associated with a technician, and/or controller 140.

In some examples, wear detection device 190 may transmit the remaining life information to cause the one or more devices to order one or more replacement components. In some instances, the remaining life information may include information identifying the one or more components and/or the one or more replacement components.

Wear detection device 190 may transmit the remaining life information to cause the one or more devices (e.g., controller 140) to cause machine 105 to autonomously navigate to a repair facility. Additionally, or alternatively, wear detection device 190 may transmit the remaining life information to cause the one or more devices to cause a calendar, of the technician, to be populated with a calendar event to inspect and/or repair the one or more components. Additionally, or alternatively, wear detection device 190 may transmit the remaining life information to cause the one or more devices (e.g., controller 140) to cause an alarm to be activated. The alarm may indicate that the one or more components are to be repaired or replaced.

In some instances, wear detection device 190 may transmit the remaining life information to cause the one or more devices to generate a service request to repair and/or replace the one or more components. As part of generating the service request, the one or more devices may perform one or more of the actions described herein.

In some examples, the action may include wear detection device 190 causing a first autonomous device to deliver the one or more replacement components to a location associated with machine 105. The location may include a current location of machine 105, a location of a work site where machine 105 performs multiple tasks, a location where machine 105 is stationed when machine 105 is not performing a task, and/or a location where machine 105 is stationed when machine 105 is undergoing repair and/or replacement. In some instances, the remaining life information may include information identifying the location associated with machine 105.

In some examples, the action may include wear detection device 190 causing a second autonomous device to navigate to the location associated with machine 105 to verify the predicted component wear information. The second autonomous device may generate verification information, based on verifying the component wear information, and may transmit the verification information to wear detection device 190. Wear detection device 190 may use the verification information to retrain machine learning model 230.

In some instances, wear detection device 190 may determine whether a failure of the one or more components is imminent (e.g., based on the predicted component wear information). If wear detection device 190 determines that the failure is imminent, wear detection device 190 may perform one or more of the actions described above. If wear detection device 190 determines that the failure is not imminent, wear detection device 190 may not perform an action.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
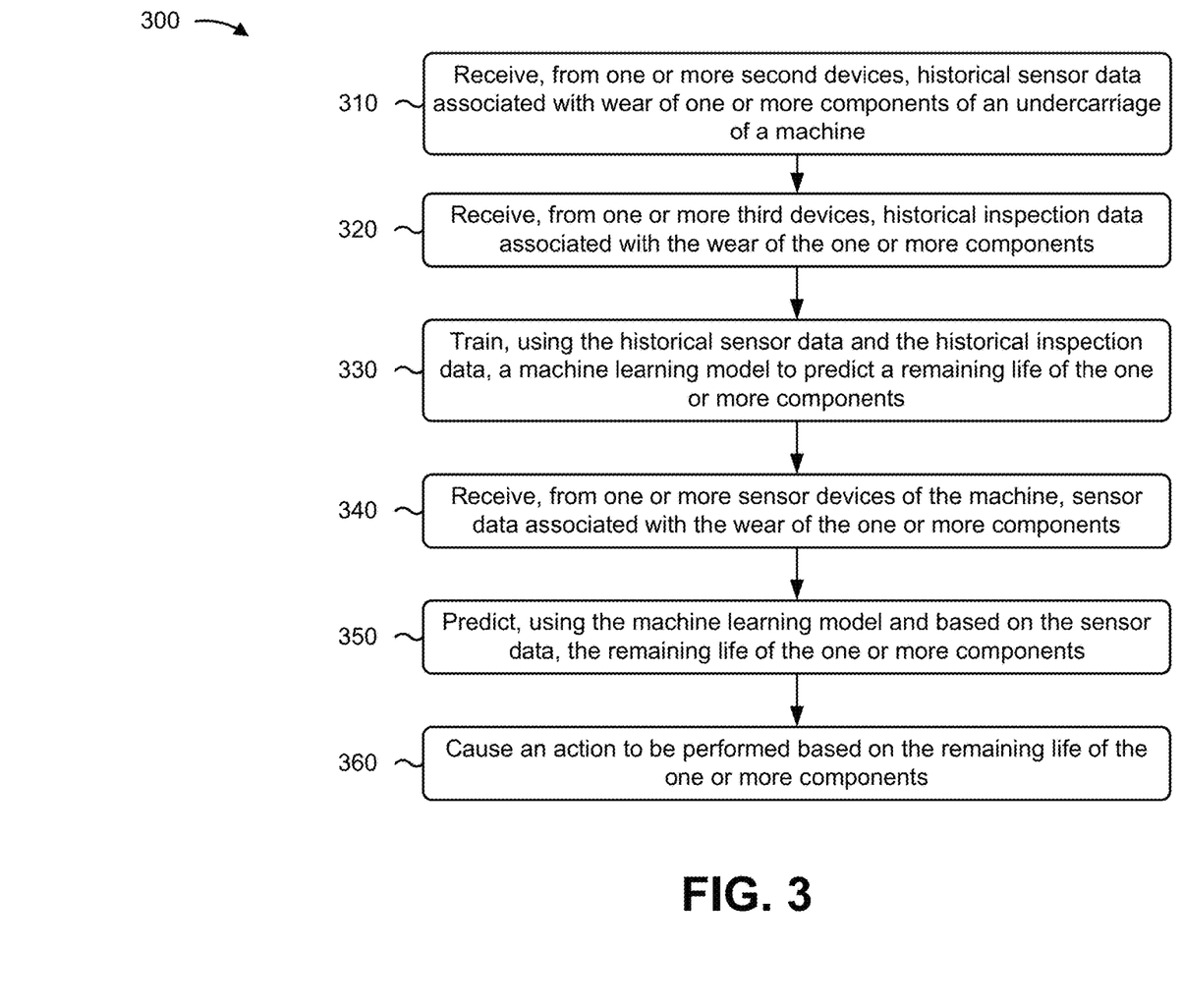
FIG. 3 is a flowchart of an example processes associated with undercarriage wear prediction using machine learning model.

FIG. 3 is a flowchart of an example process 300 associated with undercarriage wear prediction using machine learning model. One or more process blocks of FIG. 3 may be performed by a first device (e.g., wear detection device 190). One or more process blocks of FIG. 3 may be performed by another device or a group of devices separate from or including the wear detection device, such as a controller (e.g., controller 140).

As shown in FIG. 3, process 300 may include receiving, from one or more second devices, historical sensor data associated with wear of one or more components of an undercarriage of a machine (block 310). For example, the first device may receive, from one or more second devices, historical sensor data associated with wear of one or more components of an undercarriage of a machine, as described above.

As further shown in FIG. 3, process 300 may include receiving, from one or more third devices, historical inspection data associated with the wear of the one or more components (block 320). For example, the first device may receive, from one or more third devices, historical inspection data associated with the wear of the one or more components, as described above.

As further shown in FIG. 3, process 300 may include training, using the historical sensor data and the historical inspection data, a machine learning model to predict a remaining life of the one or more components (block 330). For example, the first device may train, using the historical sensor data and the historical inspection data, a machine learning model to predict a remaining life of the one or more components, as described above.

The historical sensor data and the historical inspection data are included in training data, wherein the training data includes two or more of location data identifying a location of the machine, distancing data identifying a distance traveled by the machine while performing a task at the location, speeding data identifying a speed associated with the distance traveled by the machine, machine time data identifying an amount of time during which the machine performed the task, machine vibration data identifying a measure of vibration of the machine, machine sound data identifying a measure of sound associated with the machine, force data identifying an amount of drawbar force used by the machine while performing a task at the location, abrasiveness data identifying a measure of abrasiveness of the task performed by the machine at the location, or tracking tension data identifying a track tension of the one or more components as a result of performing the task at the location, and wherein training the machine learning model comprises training the machine learning model using the two or more of the location data, the distance data, the speed data, the machine time data, the machine vibration data, the machine sound data, the drawbar force data, the abrasiveness data, or the track tension data.

The training data includes environmental data identifying environmental conditions at the location during performance of the task, and wherein training the machine learning model comprises training the machine learning model using the two or more of the location data, the distance data, the speed data, or the machine time data, the machine vibration data, the machine sound data, the drawbar force data, the abrasiveness data, the track tension data, or using the environmental data.

Training the machine learning model comprises training the machine learning model to predict a wear rate of the one or more components and to predict the remaining life of the one or more components based on the wear rate, and wherein determining the remaining life of the one or more components comprises determining an amount of wear of the one or more components based on the wear rate, and determining the remaining life of the one or more components based on the amount of wear.

As further shown in FIG. 3, process 300 may include receiving, from one or more sensor devices of the machine, sensor data associated with the wear of the one or more components (block 340). For example, the first device may receive, from one or more sensor devices of the machine, sensor data associated with the wear of the one or more components, as described above.

As further shown in FIG. 3, process 300 may include predicting, using the machine learning model and based on the sensor data, the remaining life of the one or more components (block 350). For example, the first device may predict, using the machine learning model and based on the sensor data, the remaining life of the one or more components, as described above.

As further shown in FIG. 3, process 300 may include causing an action to be performed based on the remaining life of the one or more components (block 360). For example, the first device may cause an action to be performed based on the remaining life of the one or more components, as described above.

Process 300 includes receiving simulation data from one or more fourth devices, wherein the simulation data is generated by simulating an operation of the machine and is associated with the wear of the one or more components, and wherein training the machine learning model comprises training the machine learning model using the sensor data, the historical inspection data, and the simulation data.

The sensor data includes machine vibration data regarding a measure of vibration of the machine, wherein the simulation data indicates a correlation between the measure of vibration of the machine and the wear of the one or more components, and wherein training the machine learning model comprises training the machine learning model using the machine vibration data and the simulation data.

Causing the action to be performed comprises at least one of causing an adjustment of an operation of the machine based on the predicted remaining life of the one or more components, causing a transmission of remaining life information to a device to cause the device to generate, based on the predicted remaining life, a service request to at least one of repair or replace the one or more components, wherein the remaining life information indicates the predicted remaining life of the one or more components, or causing a transmission of the remaining life information, to a device associated with an operator of the machine, to cause the operator to adjust the operation of the machine based on the remaining life information or to transmit the service request using the device associated with the operator.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

This disclosure relates to a process for predicts, using a machine learning model, remaining life of one or more components of an undercarriage of a machine. The disclosed process for predicting the remaining life of the one or more components may prevent issues associated with manual measurements of tracks of the machine (to determine an amount of wear of the tracks) and incorrect predictions of remaining life of the tracks.

Manual measurements of tracks may waste machine resources that are used to prevent movement of the machine while the manual measurements are obtained. Additionally, incorrect manual measurements of tracks and/or incorrect predictions of remaining life of tracks may waste computing resources that are used to remedy issues associated with the incorrect manual measurements and/or incorrect predictions of remaining life (e.g., premature failure of the tracks, premature repair of the tracks, and/or premature replacement of the tracks).

The disclosed process for predicting, using the machine learning model, the remaining life of the one or more components of the undercarriage may resolve the issues mentioned above with respect to the manual measurements and with respect to the incorrect predictions of remaining life. Several advantages may be associated with the disclosed process. For example, by predicting the remaining life of the one or more components using the machine learning model, the process may prevent manual measurements of the tracks (which may be inaccurate) and may prevent incorrect predictions of remaining life of the tracks.

By preventing manual measurements, the process may prevent (or limit) any disruption in the operation of the machine, prevent immobilizing the machine while the manual measurements are obtained, and prevent the incorrect predictions of remaining life. By preventing manual measurements and preventing incorrect predictions of remaining life of the tracks, the process may preserve computing or machine resources that would have otherwise been used to, to remedy issues associated with the manual measurements being inaccurate and with the incorrect predictions of remaining life of the tracks (e.g., premature failure of the tracks, premature repair of the tracks, and/or premature replacement of the tracks).

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a first device, the method comprising:
   receiving, from one or more second devices, historical sensor data associated with wear of one or more components of an undercarriage of a machine,
      wherein the historical sensor data includes machine vibration data regarding a measure of vibration of the machine;
   receiving, from one or more third devices, historical inspection data associated with the wear of the one or more components;
   training, using the historical sensor data and the historical inspection data, a machine learning model to predict a remaining life of the one or more components;
   receiving, from one or more sensor devices of the machine, sensor data associated with the wear of the one or more components;
   predicting, using the machine learning model and based on the sensor data, the remaining life of the one or more components; and
   causing an action to be performed based on the remaining life of the one or more components.

2. The method of claim 1, further comprising:
   receiving simulation data from one or more fourth devices;

wherein the simulation data is generated by simulating an operation of the machine and is associated with the wear of the one or more components; and wherein training the machine learning model comprises training the machine learning model using the historical sensor data, the historical inspection data, and the simulation data.

3. The method of claim 2,
wherein the simulation data indicates a correlation between the measure of vibration of the machine and the wear of the one or more components; and
wherein training the machine learning model comprises training the machine learning model using the machine vibration data and the simulation data.

4. The method of claim 1, wherein the historical sensor data and the historical inspection data are included in training data,
wherein the training data includes two or more of:
location data identifying a location of the machine,
distance data identifying a distance traveled by the machine while performing a task at the location,
speed data identifying a speed associated with the distance traveled by the machine,
machine time data identifying an amount of time during which the machine performed the task,
the machine vibration data,
machine sound data identifying a measure of sound associated with the machine,
drawbar force data identifying an amount of drawbar force used by the machine while performing the task at the location,
abrasiveness data identifying a measure of abrasiveness of the task performed by the machine at the location, or
track tension data identifying a track tension of the one or more components as a result of performing the task at the location; and
wherein training the machine learning model comprises training the machine learning model using the two or more of the location data, the distance data, the speed data, the machine time data, the machine vibration data, the machine sound data, the drawbar force data, the abrasiveness data, or the track tension data.

5. The method of claim 4, wherein the training data includes environmental data identifying environmental conditions at the location during performance of the task; and
wherein training the machine learning model comprises training the machine learning model using the two or more of the location data, the distance data, the speed data, or the machine time data, the machine vibration data, the machine sound data, the drawbar force data, the abrasiveness data, the track tension data, or using the environmental data.

6. The method of claim 1, wherein training the machine learning model comprises training the machine learning model to predict a wear rate of the one or more components and to predict the remaining life of the one or more components based on the wear rate; and
wherein predicting the remaining life of the one or more components comprises:
determining an amount of wear of the one or more components based on the wear rate; and
determining the remaining life of the one or more components based on the amount of wear.

7. The method of claim 1, wherein causing the action to be performed comprises at least one of:

causing an adjustment of an operation of the machine based on the remaining life of the one or more components predicted using the machine learning model;
causing a transmission of remaining life information to a device to cause the device to generate, based on the remaining life of the one or more components, a service request to at least one of repair or replace the one or more components,
wherein the remaining life information indicates the remaining life of the one or more components predicted using the machine learning model; or
causing a transmission of the remaining life information, to a device associated with an operator of the machine, to cause the operator to adjust the operation of the machine based on the remaining life information or to transmit the service request using the device associated with the operator.

8. A machine, comprising:
one or more memories; and
one or more processors configured to:
receive, from one or more sensor devices of the machine, sensor data associated with wear of one or more components of an undercarriage of the machine;
predict, using a machine learning model and the sensor data, an amount wear of the one or more components based on a wear rate of the one or more components,
wherein the machine learning model is trained, using training data, to predict the wear rate of the one or more components,
wherein the training data includes two or more of:
historical sensor data,
historical inspection data, or
simulation data of a simulation model,
wherein the two or more of the historical sensor data, the historical inspection data, or the simulation data are associated with wear of the one or more components, and
wherein the historical sensor data includes at least one of:
machine vibration data identifying a measure of vibration of the machine, or
machine sound data identifying a measure of sound associated with the machine; and
perform an action based on the amount of wear of the one or more components.

9. The machine of claim 8,
wherein the simulation data indicates a correlation between the measure of vibration of the machine and wear of the one or more components; and
wherein the machine learning model is trained using the machine vibration data and the simulation data.

10. The machine of claim 8, wherein the training data includes two or more of:
location data identifying a location of the machine,
distance data identifying a distance traveled by the machine since a repair or a replacement of the one or more components,
speed data identifying a speed associated with the distance traveled by the machine,
the machine vibration data,
the machine sound data,
drawbar force data identifying an amount of drawbar force used by the machine while performing a task at the location, abrasiveness data identifying a measure of abrasiveness of the task performed by the machine at the location, or track tension data identifying a track tension of the machine as a result of performing the task at the location; and wherein the machine learning model is trained using the two or more of the location data, the distance data, the speed data, the machine vibration data, the machine sound data, the drawbar force data, the abrasiveness data, or the track tension data.

11. The machine of claim 10, wherein the training data further includes environmental data identifying environmental conditions at the location during performance of the task;

wherein the environmental data includes at least one of moisture data identifying a measure of moisture at the location or dryness data identifying a measure of dryness at the location; and wherein the machine learning model is trained using the environmental data and the two or more of the location data, the distance data, the speed data, the machine vibration data, the machine sound data, the drawbar force data, the abrasiveness data, or the track tension data.

12. The machine of claim 8, wherein, when performing the action, the one or more processors are further configured to:

cause an operation of the machine to be adjusted based on the amount of wear of the one or more components;

transmit remaining life information to a first device to cause the first device to generate, based on the amount of wear of the one or more components, a service request to at least one of repair or replace the one or more components, wherein the remaining life information indicates the amount of wear of the one or more components; or transmit the remaining life information, to a second device associated with an operator of the machine, to cause the operator to adjust the operation of the machine based on the remaining life information or to transmit the service request using the second device associated with the operator.

13. The machine of claim 8, wherein the one or more processors are further configured to:

provide the sensor data to cause the machine learning model to be trained further based on the sensor data.

14. A system, comprising:

a device configured to:

receive, from one or more sensor devices of a machine, sensor data associated with wear of one or more components of an undercarriage of the machine;

predict, using a machine learning model and based on the sensor data, a remaining life of the one or more components, wherein the machine learning model is trained, to predict the remaining life of the one or more components, using training data that includes two or more of:

historical sensor data, historical inspection data, or simulation data of a simulation model, wherein the two or more of the sensor data, the historical inspection data, or the simulation data are associated with the wear of the one or more components, and wherein the historical sensor data includes at least one of:

machine vibration data identifying a measure of vibration of the machine, or machine sound data identifying a measure of sound associated with the machine; and cause an action to be performed based on the remaining life of the one or more components.

15. The system of claim 14, wherein, when causing the action to be performed, the device is configured to at least one of:

cause an adjustment of an operation of the machine based on the remaining life of the one or more components to decrease a wear rate of the one or more components;

cause a transmission of remaining life information to a device to cause the device to generate, based on the remaining life, a service request to at least one of repair or replace the one or more components, wherein the remaining life information indicates the remaining life of the one or more components; or cause a transmission of the remaining life information, to a device associated with an operator of the machine, to cause the operator to adjust the operation of the machine to decrease the wear rate of the one or more components.

16. The system of claim 14, wherein the device is configured to train the machine learning model, using the training data, to predict a wear rate of the one or more components and to predict the remaining life of the one or more components based on the wear rate; and wherein, when predicting the remaining life of the one or more components, the device is configured to:

determine an amount of wear of the one or more components based on the wear rate; and determine the remaining life of the one or more components based on the amount of wear.

17. The system of claim 14, wherein the simulation data indicates a correlation between the measure of vibration of the machine and the wear of the one or more components; and wherein the device is configured to train the machine learning model using the machine vibration data and the simulation data.

18. The system of claim 14, wherein the training data includes two or more of:

location data identifying a location of the machine, distance data identifying a distance traveled by the machine since a repair or a replacement of the one or more components, speed data identifying a speed associated with the distance traveled by the machine, the machine vibration data, the machine sound data, drawbar force data identifying an amount of drawbar force used by the machine while performing a task at the location, abrasiveness data identifying a measure of abrasiveness of the task performed by the machine at the location, or track tension data identifying a track tension of the one or more components as a result of performing the task at the location.

19. The system of claim 18, wherein the device is configured to retrain the machine learning model using the two or more of the location data, the distance data, the speed data, the machine vibration data, the machine sound data, the drawbar force data, the abrasiveness data, or the track tension data.

20. The system of claim 19, wherein the training data further includes moisture data identifying a measure of moisture at the location; and
   wherein the device is configured to retrain the machine learning model using the moisture data and the two or more of the location data, the distance data, the speed data, the machine vibration data, the machine sound data, the drawbar force data, the abrasiveness data, or the track tension data.

\* \* \* \* \*